(12) United States Patent
Squires et al.

(10) Patent No.: US 10,670,853 B2
(45) Date of Patent: Jun. 2, 2020

(54) IMAGING SYSTEM WITH AN OPTICAL PATH AND TELESCOPE SHAPE OPTIMIZED FOR NANOSATELLITES

(71) Applicant: Hera Systems, Inc., San Jose, CA (US)

(72) Inventors: David D. Squires, Stockton, CA (US); Peter Mrdjen, Aptos, CA (US); Robert Machinski, Campbell, CA (US); Jolyon D. Thurgood, San Francisco, CA (US); Brij Agrawal, Monterey, CA (US); Greg Defouw, Redwood City, CA (US); Jeffrey Wedmore, San Jose, CA (US)

(73) Assignee: Hera Systems, Inc., San Jose, CA (US)

( * ) Notice: Subject to any disclaimer, the term of this patent is extended or adjusted under 35 U.S.C. 154(b) by 74 days.

(21) Appl. No.: 15/413,406

(22) Filed: Jan. 23, 2017

(65) Prior Publication Data

US 2017/0299855 A1 Oct. 19, 2017

Related U.S. Application Data

(60) Provisional application No. 62/286,234, filed on Jan. 22, 2016.

(51) Int. Cl.
*G02B 23/02* (2006.01)
*G02B 23/24* (2006.01)
*G02B 23/06* (2006.01)
*G02B 17/08* (2006.01)

(52) U.S. Cl.
CPC ............ *G02B 23/02* (2013.01); *G02B 17/08* (2013.01); *G02B 23/06* (2013.01); *G02B 23/2492* (2013.01)

(58) Field of Classification Search
CPC ........ G02B 23/02; G02B 17/08; G02B 23/06; G02B 23/12; G02B 23/2492; G02B 26/0816; G02B 26/0875; G02B 27/0025; G02B 27/1006; G02B 27/14
USPC ....................................................... 359/399
See application file for complete search history.

(56) References Cited

U.S. PATENT DOCUMENTS

| | | | |
|---|---|---|---|
| 2002/0041328 A1 | 4/2002 | LeCompte et al. | |
| 2004/0119020 A1 | 6/2004 | Bodkin | |
| 2009/0015891 A1 | 1/2009 | Kane | |
| 2010/0053609 A1* | 3/2010 | Chrisp | G01J 3/02 356/328 |
| 2011/0193814 A1 | 8/2011 | Gay et al. | |
| 2011/0292505 A1 | 12/2011 | Kurtz et al. | |
| 2013/0155218 A1 | 6/2013 | Kalkbrenner et al. | |
| 2013/0223832 A1 | 8/2013 | Miesak | |

(Continued)

OTHER PUBLICATIONS

International Search Report and Written Opinion dated May 26, 2017, International Patent Application No. PCT/US2017/014636, filed Jan. 23, 2017.

*Primary Examiner* — Wen Huang
(74) *Attorney, Agent, or Firm* — Philip H. Albert; Davis Wright Tremaine LLP

(57) ABSTRACT

To maximize the light capturing and imaging resolution capability of an imaging satellite while minimizing weight, the primary reflector and other elements of the optical path have a shape optimized to the shape of the satellite. For a nanosatellite with a square cross-section, the first mirror and other elements of the telescope section in the optical path have a square cross-section, as does the sensor array of the camera section.

13 Claims, 13 Drawing Sheets

(56) References Cited

U.S. PATENT DOCUMENTS

2014/0195150 A1 7/2014 Rios
2015/0326769 A1 11/2015 Richarte et al.

* cited by examiner

| Band | Wavelength |
|---|---|
| Coastal Blue | 400-450 nm |
| Blue | 450-510 nm |
| Green | 510-580 nm |
| Yellow | 585-625 nm |
| Red | 630-690 nm |
| Red Edge | 705-745 nm |
| NIR-1 | 770-895 nm |
| NIR-2 | 860-1040 nm |

FIG. 12

Camera 1

| R | Y | R | Y |
|---|---|---|---|
| G | B | G | B |
| R | Y | R | Y |
| G | B | G | B |

Camera 2

| CB | RE | CB | RE |
|---|---|---|---|
| N1 | N2 | N1 | N2 |
| CB | RE | CB | RE |
| N1 | N2 | N1 | N2 |

FIG. 13

“Mrdjen”).

IMAGING SYSTEM WITH AN OPTICAL PATH AND TELESCOPE SHAPE OPTIMIZED FOR NANOSATELLITES

CROSS-REFERENCES TO PRIORITY AND RELATED APPLICATIONS

This application claims priority from and is a non-provisional of U.S. Provisional Patent Application No. 62/286,234 filed Jan. 22, 2016 entitled "Imaging System with an Optical Path and Telescope Shape Optimized for Nanosatellites."

Related applications include:

U.S. Provisional Patent Application No. 62/286,225 filed Jan. 22, 2016 entitled "Multi-Camera Imaging System for Nanosatellites" naming Mrdjen et al. ("Mrdjen").

U.S. Provisional Patent Application No. 62/286,229 filed Jan. 22, 2016 entitled "Image Stabilization and Pixel Shifting for a Nanosatellite Imaging System" naming Squires et al. ("Squires II").

U.S. patent application Ser. No. 15/413,409 filed Jan. 23, 2017 entitled "Multi-Camera Imaging System for Nanosatellites".

U.S. patent application Ser. No. 15/413,413 filed Jan. 23, 2017 entitled "Image Stabilization and Pixel Shifting for a Nanosatellite Imaging System".

The entire disclosure(s) of application(s)/patent(s) recited above is(are) hereby incorporated by reference, as if set forth in full in this document, for all purposes.

All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

FIELD OF THE INVENTION

The present disclosure generally relates to satellite-based imaging systems and more generally to nanosatellites that are orbiting vehicles with highly constrained size requirements.

BACKGROUND

The costs to launch a rocket into Earth orbit can run into the millions of dollars. As a rocket can carry multiple satellites and other equipment, the cost of the launch can be allocated among the different payloads. Consequently, smaller satellites might incur smaller costs to get into orbit. The measure of a size of a satellite could relate to its mass, its volume, its height, width and depth, as well as its shape. As for shape, it might be that the cost of getting equipment onto a launch bay is a function of the envelope of the satellite.

In view of these considerations, nanosatellites are often deployed, especially where the desired functionality fits in a nanosatellite form factor and where a constellation of satellites are needed. The term "nanosatellite" often refers to an artificial satellite with a wet mass between 1 and 10 kg, but it should be understood that features might be present in satellites outside that range. A constellation of smaller satellites might be more useful than one large satellite for the same or similar construction and launch budget. However, the result is usually that a rocket payload comprises many more independent vehicles.

To accommodate a large number of independent satellites, rocket logistics often dictate that the satellites be rectangular prisms or other shapes that are space-filling. For example, some nanosatellites are generally cube shaped. Typically these satellites include propulsion, solar panels for on-board electrical power generation, and communications capabilities. Some satellites are used for imaging and might include a telescope assembly for light gathering and a camera assembly for converting gathered light into electronic data, which can then be processed on-board and/or communicated to another satellite or a ground station.

For a celestial imaging system that has missions to capture images of the Sun, the Moon, starts and other astronomical objects, the particular orbit might not matter. However, for Earth-observing satellites, closer is better. Of course, there are limits to how low an orbit can be and still be viable. As a result, such a satellite is performing as a terrestrial long distance imaging system, and has a number of challenges. One is the distance between the satellite and the target of an imaging process. Another is that the satellite is not anchored, so internal movements can cause rotations of the satellite. Also, the satellite is moving at a high speed in order to maintain its orbit, which means the satellite is not stationary with respect to the target. The terrestrial long distance imaging system has to also deal with the conditions of operating in space and the stress of launch. Consequently, there are a number of areas in which satellite imaging systems can benefit from improvement

SUMMARY

A satellite imaging system used in a satellite has a telescope section including a first reflector that is substantially square and sized to fit into a substantially square aperture of a satellite body, a second reflector, positioned to reflect light reflected from the first reflector, and a lens set including one or more lenses positioned in an optical path of the telescope section. A sensor array is positioned to receive light from the telescope section when light is received through the substantially square aperture, where the sensor array is substantially square.

The satellite imaging system may have a second reflector that is substantially square and/or constructed to counteract image distortions as might occur due to being substantially square. The second reflector might be round. The lens set might be square or round.

The satellite imaging system might include baffles that are substantially square or substantially round. The elements are substantially square when the elements have a form factor of a square adjusted for structural components needed to provide structural stability to the elements or other components of a satellite containing the satellite imaging system. The first reflector, the second reflector, and/or one or more lenses of the set of lenses can include thermally matched materials in that the thermally matched materials will limit distortion of a final image over a predetermined set of operating conditions. The first reflector, the second reflector, and/or one or more lenses of the set of lenses might be movable by motorized or deformable positioners to perform dynamic compensation of positional error and/or compensation for mechanical variations. The satellite imaging system may also include an imaging system with optical path optimized for nanosatellites.

Various aspects, advantages, features and embodiments are included in the following description of exemplary examples thereof, which description should be taken in conjunction with the accompanying drawings. The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 10 is a cut-away view of an optical barrel section.

FIG. 12 is a chart of spectral bands.

FIG. 13 illustrates examples of color filters used on pixel arrays.

DETAILED DESCRIPTION

Figure 1:
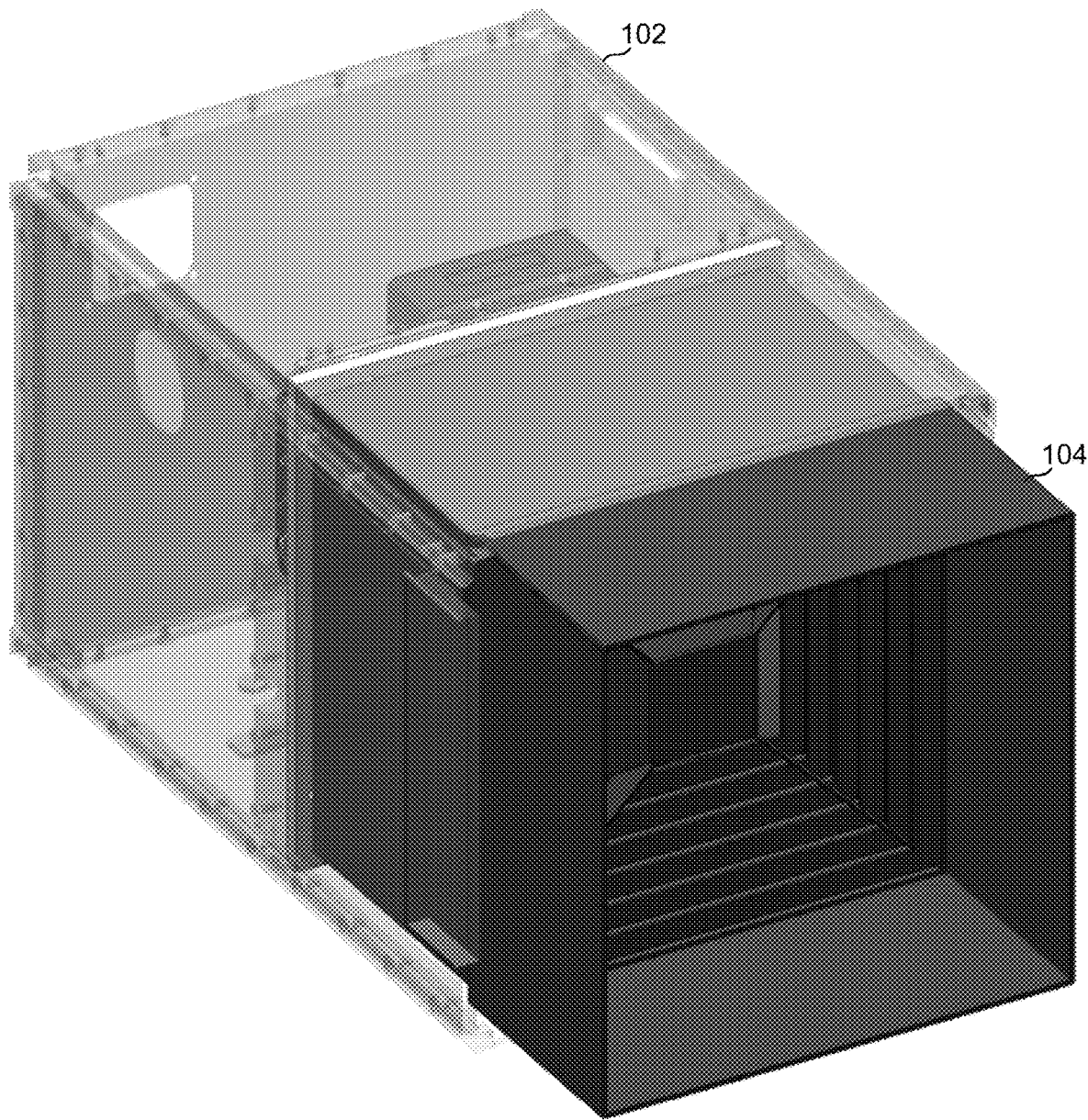
FIG. 1 is a front isometric view of an imaging nanosatellite.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include an imaging satellite with a square primary reflector and other variations include other noncircular shapes.

An imaging system of an imaging satellite will have an aperture, optical components and light sensors. The aperture is where the light enters the imaging system. That light is optically processed by reflectors and other components so that the light generally falls onto a light sensor. A common sensor is a sensor array comprising a two-dimensional (2D) array of pixels. Each pixel electrically responds to light impinging on the pixel. The imaging system also includes electronics to measure a pixel's response and record image data based on the responses. An example sensor array might be a 1024 by 1024 pixel array (1 megapixel) or a 5,120 by 5,120 pixel array (25 megapixel), but could also be anon-square array, such as a rectangle or some other shape.

The imaging system also includes a processor that interacts with the electronics to, for example, process the image data recorded by the electronics or image data sent directly to the processor from the electronics without recording. The processor might compress the image data, perform some calculations, and/or modify the image data. The processor might also coordinate with a communications system to transmit some of the image data to other satellites and/or ground stations. The image data can be in the form of single 2D array of values or multiple 2D arrays of values. The image data might also include a time component, such as where not all of the pixels were read at the same instant in time and the image data might include a sequence of readings, such as might be used to form a video sequence.

In communicating image data, or even when not communicating image data, the processor might direct the communications system to send non-image data, such as satellite performance data, settings and other data. Some data stored by the processor might include mission data. Mission data might specify, for one or more missions, which images to capture and when and other details of image capture. The processor might also control other aspects of the satellite, such as how to position and reposition the satellite during, before or after an imaging event. As should be understood, the processor might implement various functions and provide equivalent structure to physical components by virtue of program code that is stored in program code memory and is executed by the processor as part of the operation of the processor. The particular operation(s) of the processor might be determined by the particular construction of the processor and/or the program code in program memory that the processor is designed to execute.

The optical components might include reflectors (mirrors), lenses, prisms, splitters, collimators, filters, obscurers and the like. Some of these components can be movable, possibly under control of the processor via motors, actuators, etc. that are controllable by the processor. Some of the obscurers are part of the optical components, while others are unrelated to the optical path. For example, where a primary reflector is used with a secondary reflector, the secondary reflector and struts that hold the secondary reflector in place might be obscurers in the optical path. The optical path might also be obscured by hinges or other necessary parts of the satellite that cannot be, or cannot easily be, removed from the optical path from the aperture to the sensor array(s). A shroud or baffle might be used in or around the aperture to block undesired light from entering the aperture.

To maximize the light capturing and imaging resolution capability of an imaging satellite while minimizing weight, the primary reflector and other elements of the optical path should have a shape optimized to the shape of the satellite and have surfaces as large as possible. For a nanosatellite with a square cross-section, the first mirror and other elements of the telescope section in the optical path can have a square cross-section. This increases the light collecting area, and also allows the shape of the image plane formed by these optics to more nearly match the square or rectangular shape of commercially available sensor arrays used in the camera section of an imaging system. Another advantage is that with a square aperture, the aperture diameter (diagonal dimension) is larger and thus the resolution of the telescope is improved.

In an example imaging system described herein, the aperture is square, or at least substantially square. In some embodiments, the aperture is square with chamfered corners. Such an aperture might be found on a satellite that uses chamfered corners. Regardless of the details, the aperture can have a larger area than a corresponding inscribed circle, thereby increasing the amount of light collected and also causing a larger percentage of collected light to fall on pixels, per unit time, in a sensor array than if the profile of the light were circular.

In some aspects, the chamfering can be used to reduce diffraction artifacts and point spread function distortion.

In some embodiments, each other optical component is shaped commensurate with the aperture shape. For example, where the aperture is square, the secondary reflector can be square, lenses can be square, etc. Alternatively, some of the components in the path can be round so as to simplify construction, while still taking in all available light.

The result is greater use of light energy both in collecting light and in applying light to the sensor. A further advantage is the increase in aperture that is represented by the diagonal dimension of a square aperture as compared to the diametric dimension of a circular aperture designed to fit in the same spacecraft. The diagonal dimension increases the sampling frequency of the telescope, and the square shape of the aperture provides a point spread function (PSF) that has a squarish central spot that is narrower than the Airy disk provided by a circular aperture. The result is higher resolution performance.

While telescope resolution benefits from increased aperture size, the resolution and image quality performance of a satellite imaging system is also, in part, dependent upon the amount light that it is able to gather. Additional light can improve signal-to-noise ratios and dynamic ranges of images collected, which generally results in better images, with improved crispness and better contrast.

For reflecting type telescopes, improving aperture size and light collection depends, in large part, upon the unobstructed area of the primary mirror of the telescope. The useful area of the mirror is limited by the size of the satellite, and the size of obstructions (e.g., from the secondary mirror, support structures, and light baffles) depend, mainly, on the focal length and structural requirements of the telescope design. Conventionally, such telescopes have used round mirrors for their first reflector and imaging satellites have had round cross sections, conforming to the mirror shape as well as the shape of the launch vehicle. A round telescope is also often used in a square cross-section satellite. The other elements in the telescope (such as secondary mirrors, light baffles, and lenses) also have used a conventional round shape, although the sensing array may be rectangular, resulting in the loss of a portion of the gathered light. This is similar to the situation in a standard digital camera, where the sensor array of charge coupled devices (CCDs) or complementary metal-oxide semiconductor (CMOS) devices is rectangular (corresponding to the shape of a photograph), while the lens and other optics are round for convenience, resulting in a loss of a crescent shaped region at each of the image's edges.

For many available nanosatellite launches, a square or rectangular dispenser compartment is provided to encapsulate and fit multiple satellites in a single launch dispenser. For these dispensers, the individual nanosatellites are no longer round, but typically will have a square cross-section. Accordingly, to optimize telescope performance, it is more beneficial to make a mirror with increased surface area to fit within the square satellite. Maximizing the first reflector's size to capture more light and increase aperture dimensions while still conforming to the shape of the nanosatellite can be obtained by use of a square first reflector, perhaps with rounded or chamfered corners if needed due to the satellite's internal construction or optical diffraction characteristics. To compensate for the increased mass of a square mirror with larger area, material is machined away from the back of the mirror in a process called "light-weighting" which results in a stiff but light weight structure. The mass difference relative to a circular mirror is very manageable.

As the resultant image from the first reflector will be square, and the image sensing array is square or rectangular, it is not necessary to use conventional round elements for a secondary reflector, lenses, and other elements in the optical path. To optimize light gathering while minimizing cost, a square secondary reflector may be used while any internal corrective lenses may be circular. The reflected light beam remains square in shape until it arrives at the sensor. As minimizing the mass of the nanosatellite is important, using a square secondary reflector, baffles, lenses (if desired) and other elements of the optical path will reduce weight while still transmitting all of the light gathered at the primary reflector to the sensor array. This can require use of some unusually shaped elements, since lenses, for example, are usually round. The non-round elements should be aligned in rotation about the central optical axis as any square optical or baffle elements will lack rotational symmetry about this axis, but in some cases that might not be a concern.

For optical alignment of square optical elements (mirrors, lenses, prisms, and baffles), this can be done during construction and fixed in place, but in some embodiments, image rotation devices (e.g. prisms) take advantage of the beneficial asymmetry of the square aperture's point spread function. The diagonal of the aperture provides higher resolution than the width or height. Image rotation would take advantage of this by enabling alignment of the higher resolution diagonal dimension of the optics with the higher resolution width dimension of the sensor array, should one be present.

The exemplary embodiments described here are based on a satellite with a square cross-section, as this is a typical configuration for the packing of nanosatellites as a payload into a launch vehicle, but can be extended to other configurations that lack the conventional rotational symmetry. For example, rectangular or hexagonal cross-sections also lend themselves to dense packing. In these other shapes, the mirror would again be determined by the shape of the satellite in order maximize the available light gathering, while minimizing the mass of the elements along the optical path by using the same shape for these.

FIG. 1 is a front isometric view for an example of an imaging nanosatellite. The satellite is a rectangular box shape, with a square cross-section, that allows a number of such satellites to be stacked compactly as the payload of a launch vehicle. The square telescope provides for optimal use of the satellite cross-section, thereby allowing an increase in aperture area and a diagonal aperture dimension beyond what a circular aperture would provide within the same cross-section. This provides a correspondingly increased light collecting ability and a larger effective aperture dimension on the diagonal of the mirror. The satellite 102 is shown with a deployable fore-baffle 104 extended to aid with stray light control, but which can be retracted to keep the satellite compact. At the rear is the camera system, which is partially visible in the view of FIG. 1.

Figure 2:
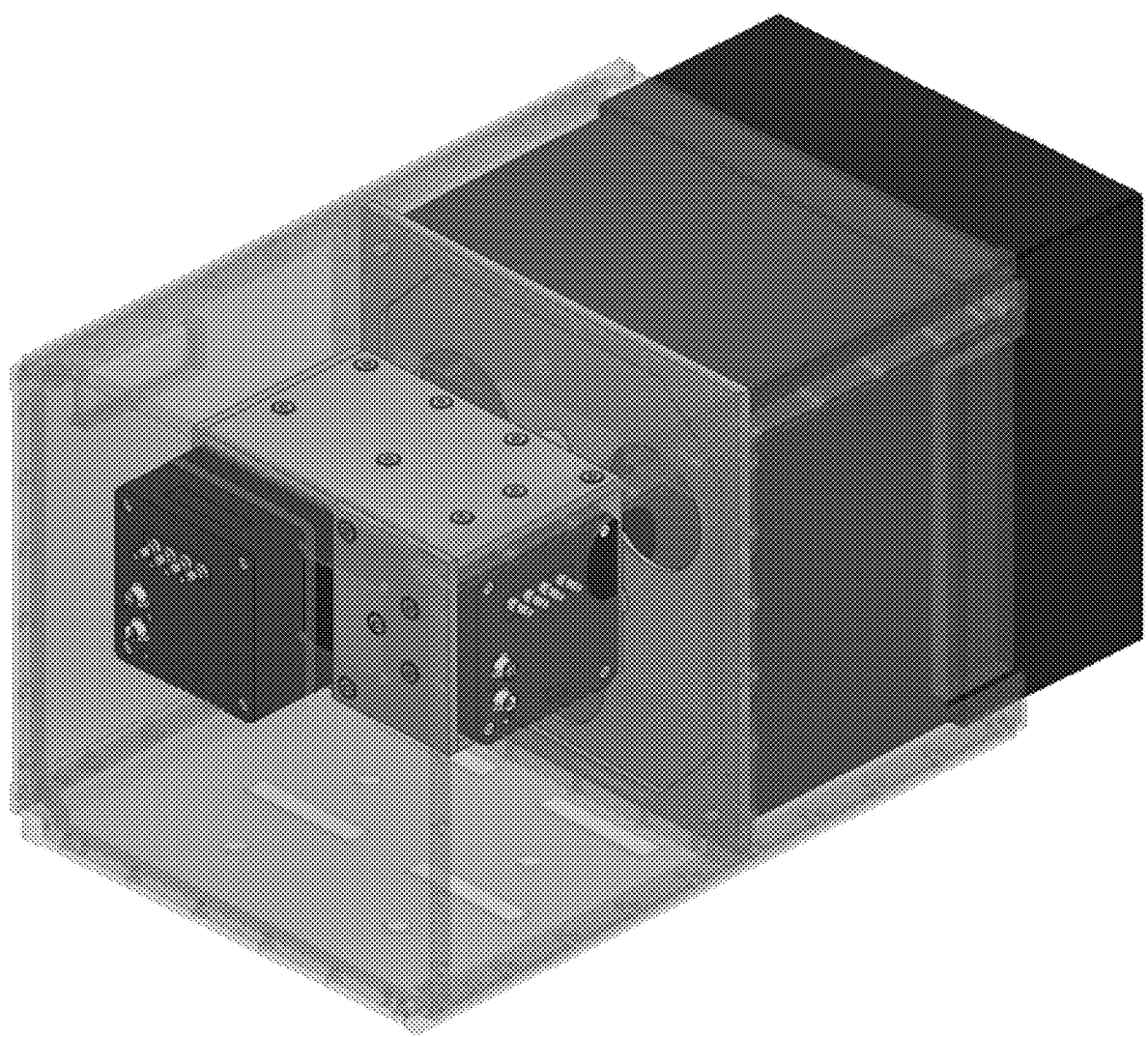
FIG. 2 is a rear isometric view of an imaging nanosatellite.

The camera system is more visible in the rear isometric view of FIG. 2. In this example, a dual camera system with a dichroic beam splitter in the optical pathway is shown, but the arrangement of the optimized optical path can also be used with a more conventional single sensing array arrangement or with additional beam splitters and cameras.

This arrangement provides for an increase in aperture, improvement in optical resolution, reduction in achievable Ground Sample Distance (GSD), and an increase in light collection. Ground Sample Distance is essentially the distance between pixel centers as they would appear if the pixel outlines were projected on the ground, namely the boundary of the area sensed by each pixel on the Earth's (or another target's) surface. The distance between these square area centers is the GSD.

Figure 3:
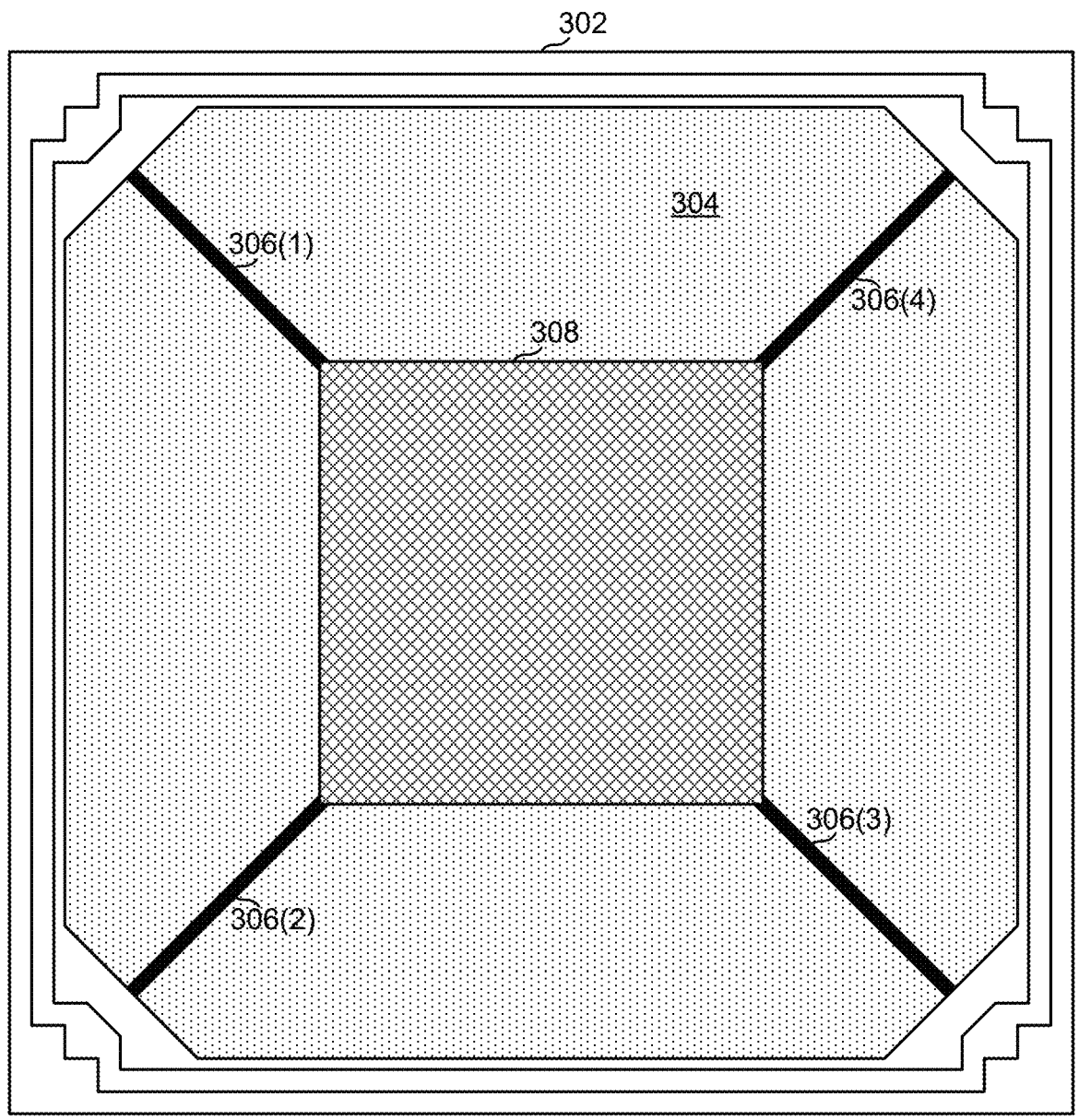
FIG. 3 is a front planar view of a telescope section of an imaging nanosatellite.

FIG. 3 is a front planar view of a telescope section of an imaging system of a satellite 302. FIG. 3 shows a primary reflector 304, a secondary reflector 308 and struts 306(1)-(4) for supporting secondary reflector 308. Struts 306 can be attached to satellite 302 in the plane of secondary reflector 308 and/or attached more to the rear, such as further back on or through primary reflector 304. In this example, secondary reflector 308 is square and occupies around 20% of the aperture. In other variations, the percentage is higher or lower.

In some variations, secondary reflector 308 is round, but square secondary reflectors might be preferred when the area of the round secondary reflector that is outside an inscribed square is not illuminated by light from the primary reflector, as that area outside the inscribe square might obscure light from entering the aperture in the first place.

Figure 4:
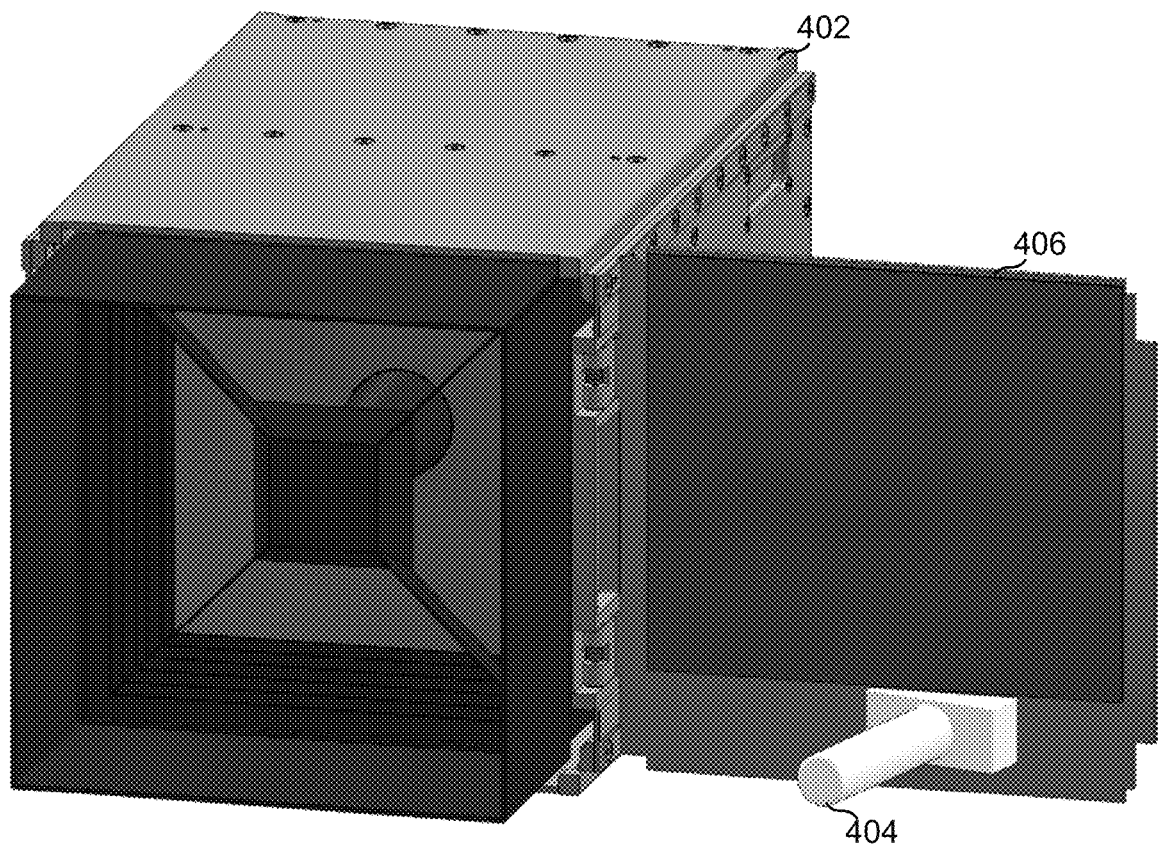
FIG. 4 is an isometric view of an imaging nanosatellite in a deployed mode with communications antennas deployed.

FIG. 4 is an isometric view of an imaging nanosatellite 402 in a deployed mode with communications antennas deployed. In this example, there is a planar antenna 406 and another antenna 404.

Figure 5:
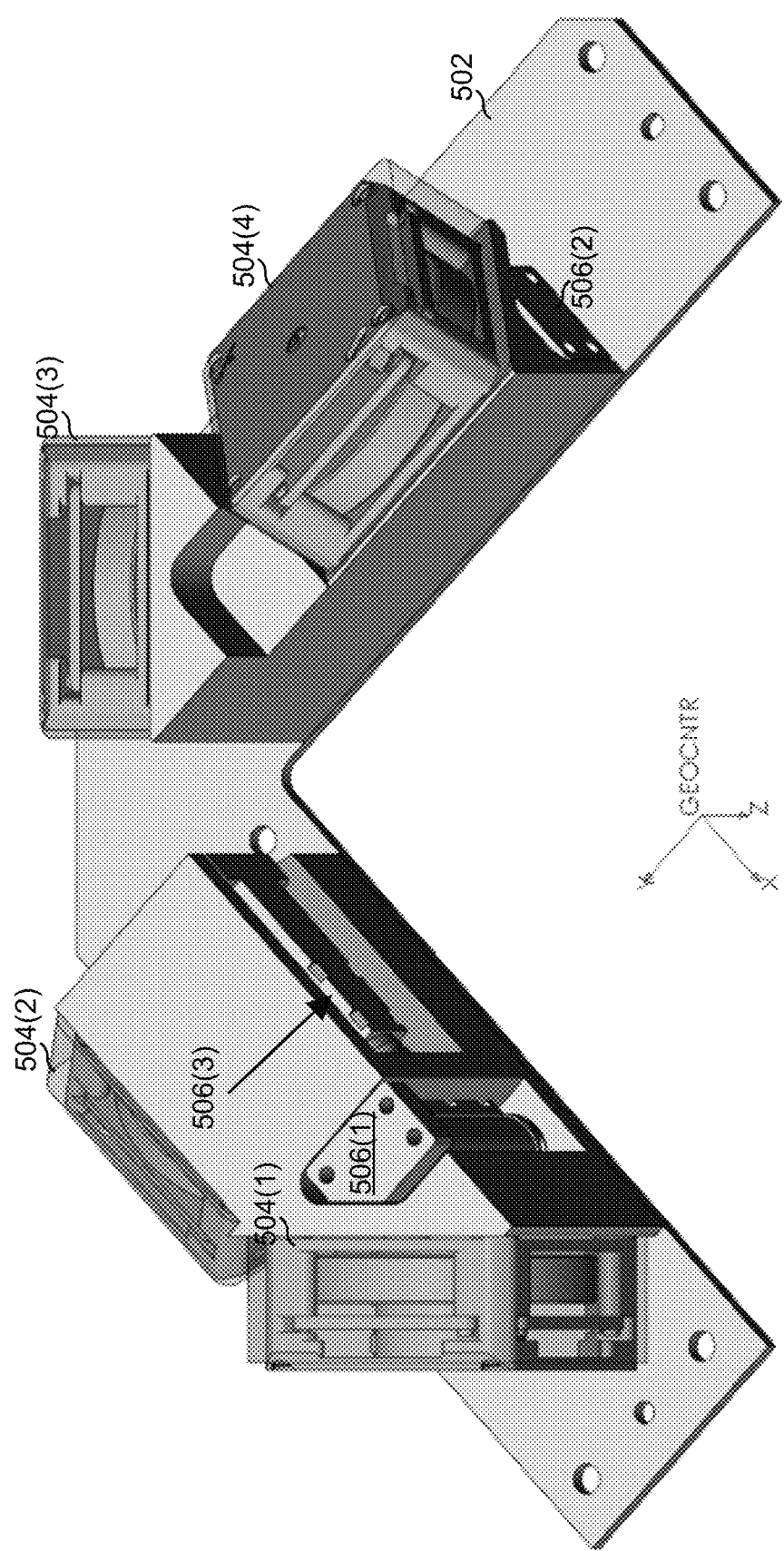
FIG. 5 is an illustration of a rotation control assembly.

FIG. 5 is an illustration of a rotation control assembly 502 including reaction wheels 504(1)-(4) and torque rods 506(1)-(3).

Figure 6:
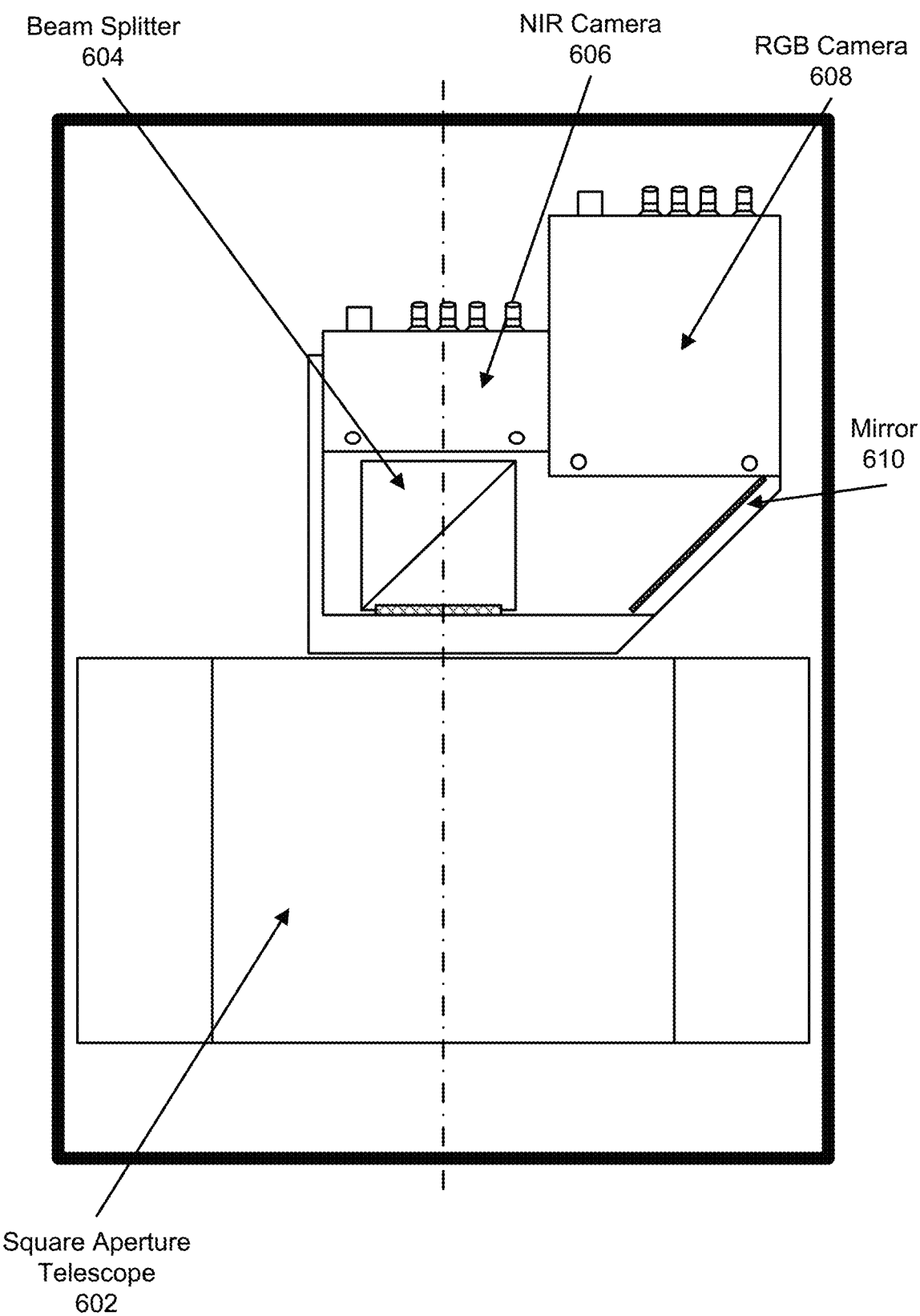
FIG. 6 is an illustration of an example imaging system with arrangement of multiple cameras and a square aperture telescope section.

FIG. 6 is an illustration of an example dual-camera imaging system with arrangement of multiple cameras and a square aperture telescope section. The imaging system includes a square aperture telescope section 602, a beam splitter 604, a mirror 610, a first camera 608 and a second camera 606.

Figure 7:
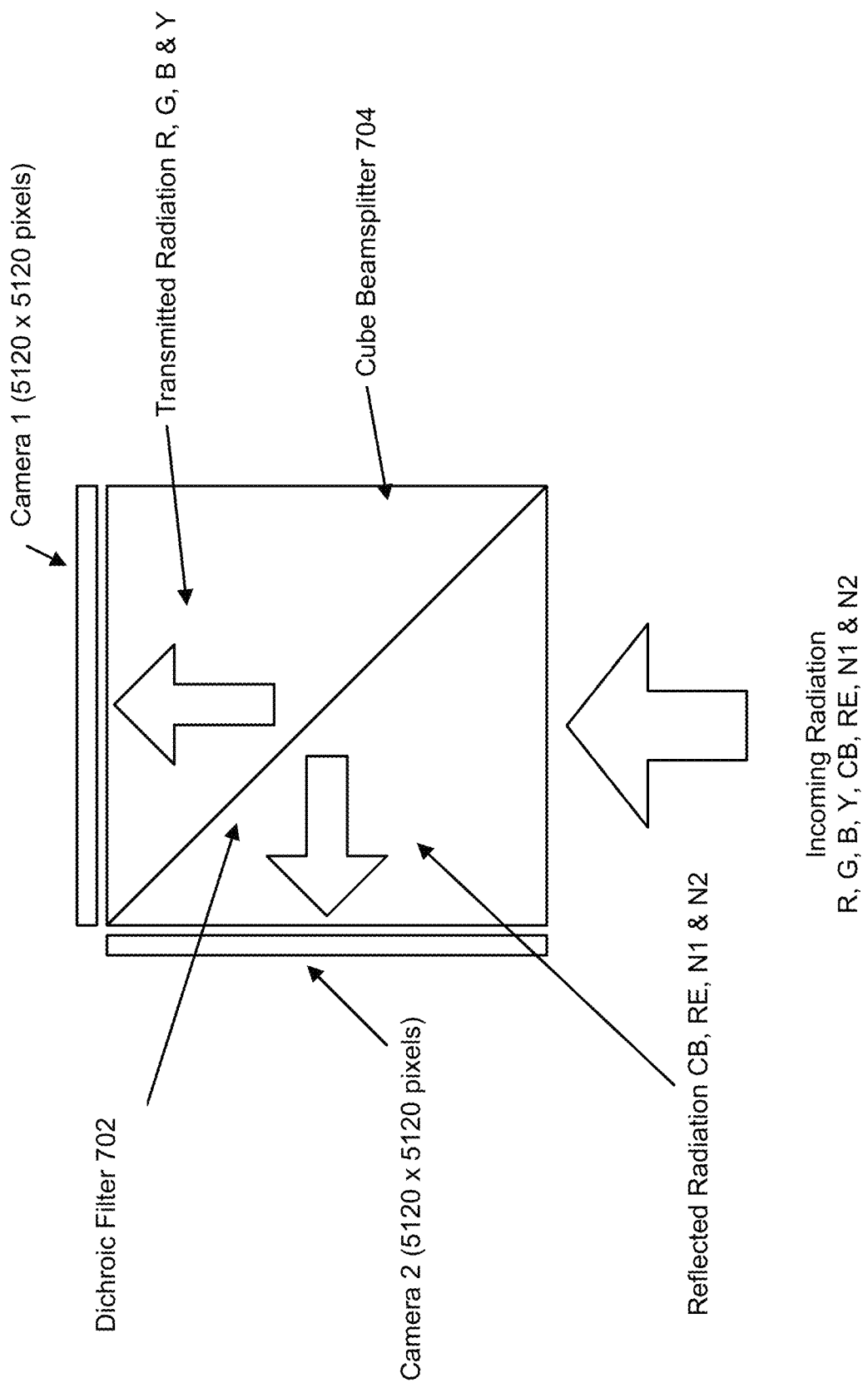
FIG. 7 is a schematic illustration of light paths of the imaging system of FIG. 6.

FIG. 7 is a schematic illustration of light paths of the imaging system of FIG. 6.

Figure 8:
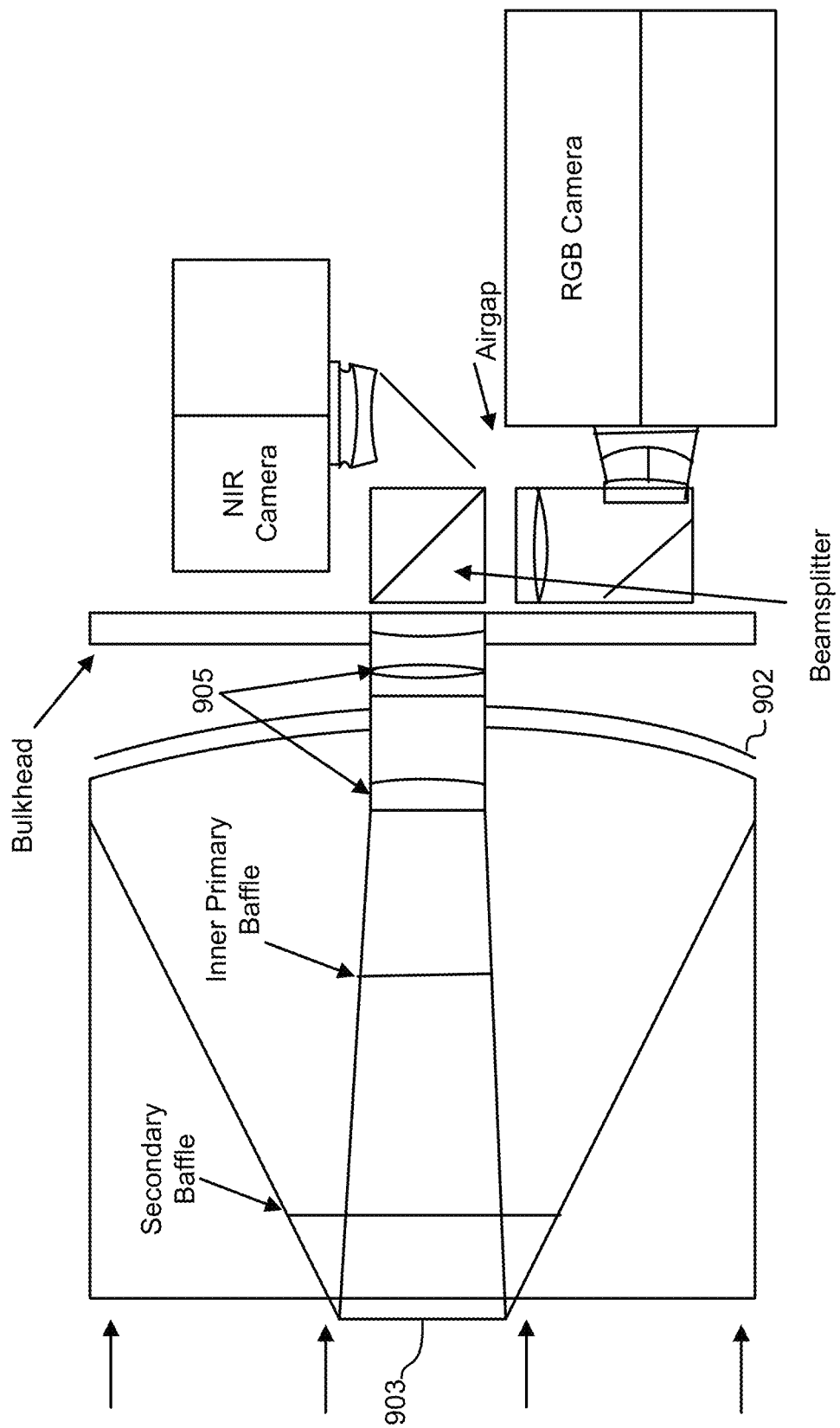
FIG. 8 is a top, cross-sectional view of components of the imaging system of FIG. 6.

FIG. 8 is a top, cross-sectional view of components of the imaging system of FIG. 6, including a primary reflector 902, a secondary reflector 903, and a set of lenses 905.

Figure 9:
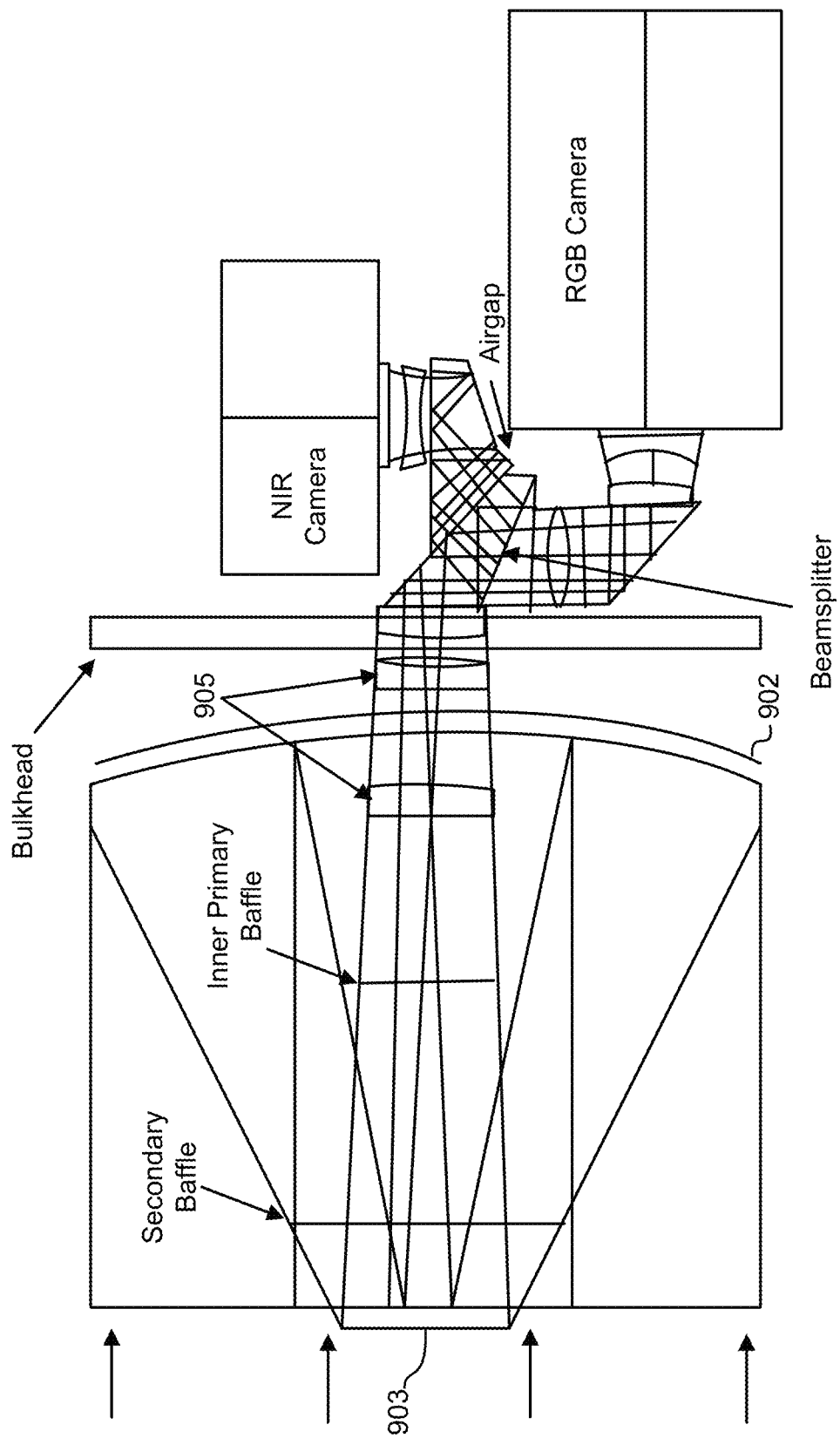
FIG. 9 is a top, cross-sectional view of components of the imaging system of FIG. 6, illustrating light paths.

FIG. 9 is a top, cross-sectional view of components of the imaging system of FIG. 6, illustrating light paths. The incoming light is incident on primary reflector 902. For compactness in the telescope volume, the primary reflector 902 has increased hyperbolic curvature relative to most commercial telescopes. Primary reflector 902 reflects the incident light onto secondary reflector 903, also with increased curvature, which in turn reflects the light through the set of lenses 905 and on to the sensors, where the paths of a number of rays are shown. The inner primary baffle and secondary baffle are also designed to be square to minimize mass. The square shape of the secondary baffle also allows more light energy per unit time to arrive at the primary mirror than a traditional circular baffle would. The latter further enhances signal to noise ratio (SNR) of the telescope.

In the example here, the sensor array includes two separate cameras. After the lens, the optical path includes a dichroic splitter to separate out different frequency ranges used by the sensor arrays after filtering of wavelengths by the Color Filter Arrays (CFAs) for two cameras, which in this example has one camera for the standard visible spectrum that uses an RGBY colorspace sensor array and another camera for frequencies on either or both sides of the visible, such as bands known as Coastal Blue (near UV), Red Edge, and near infrared (NIR). More generally, other sensor arrays can be used, with sensitivity to bands well beyond those discussed here; and, more cameras with different filter and sensor arrays, or a single camera with a different filter and sensor array can be used after lenses 905.

The performance demands of this design make it sensitive to thermal variations. Accordingly, the structural materials and lens arrangement should be carefully selected to compensate for the temperature range expected in a wide range of orbits. This so-called athermal design provides for consistent imaging performance and also makes it possible to use a wide number of launch opportunities, even if the initial orbit altitude of some launches is above the nominal operating altitude of the telescope design. Good imaging will still be possible, and the spacecraft propulsion system will lower altitude to improve the GSD of the imager.

Figure 10A:
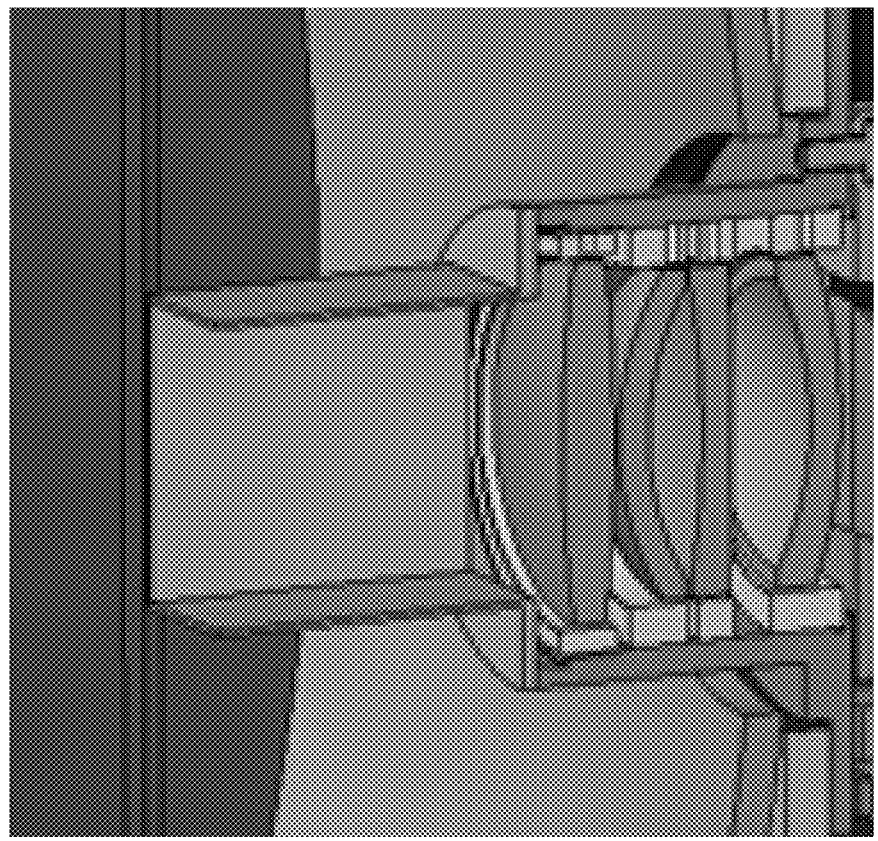
FIG. 10(a) is an angled view.

FIG. 10 is a cut-away view of an optical barrel section; FIG. 10(a) is an angled view. In the background is the primary mirror. The cut-away image of a central baffle shows a square fore-section with a circular barrel section passing through the primary mirror. Light enters the square opening from the left, and passes out of the baffle section to the right where the remaining optics and cameras are positioned.

Figure 10B:
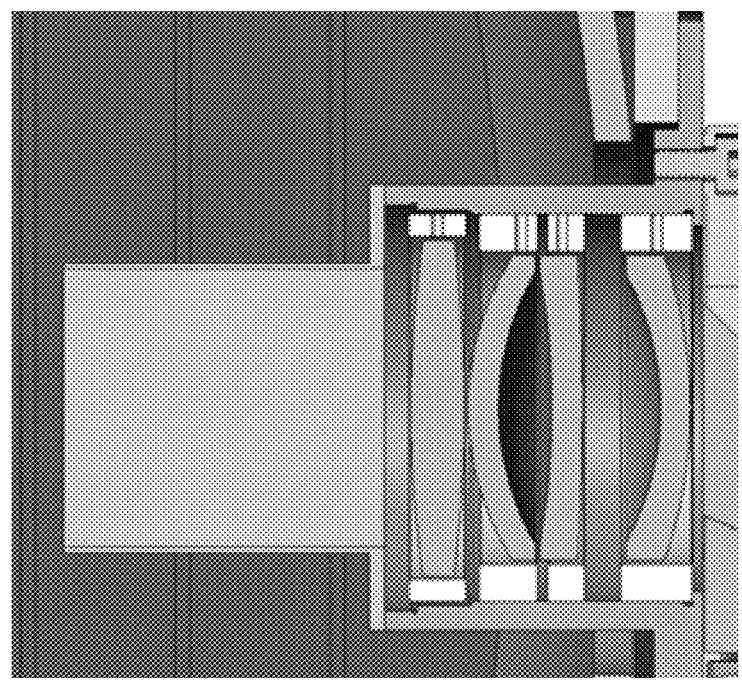
FIG. 10(b) is a straight-on side view.

FIG. 10(b) is a straight-on side view of the same cut-away. The baffle that passes through the primary mirror may be square, but if it is round at the point it passes through the primary mirror and above that (closer to the secondary mirror) the baffle is square, this can improve the handling of stray light by restricting the size of the open end of the baffle.

Figure 11:
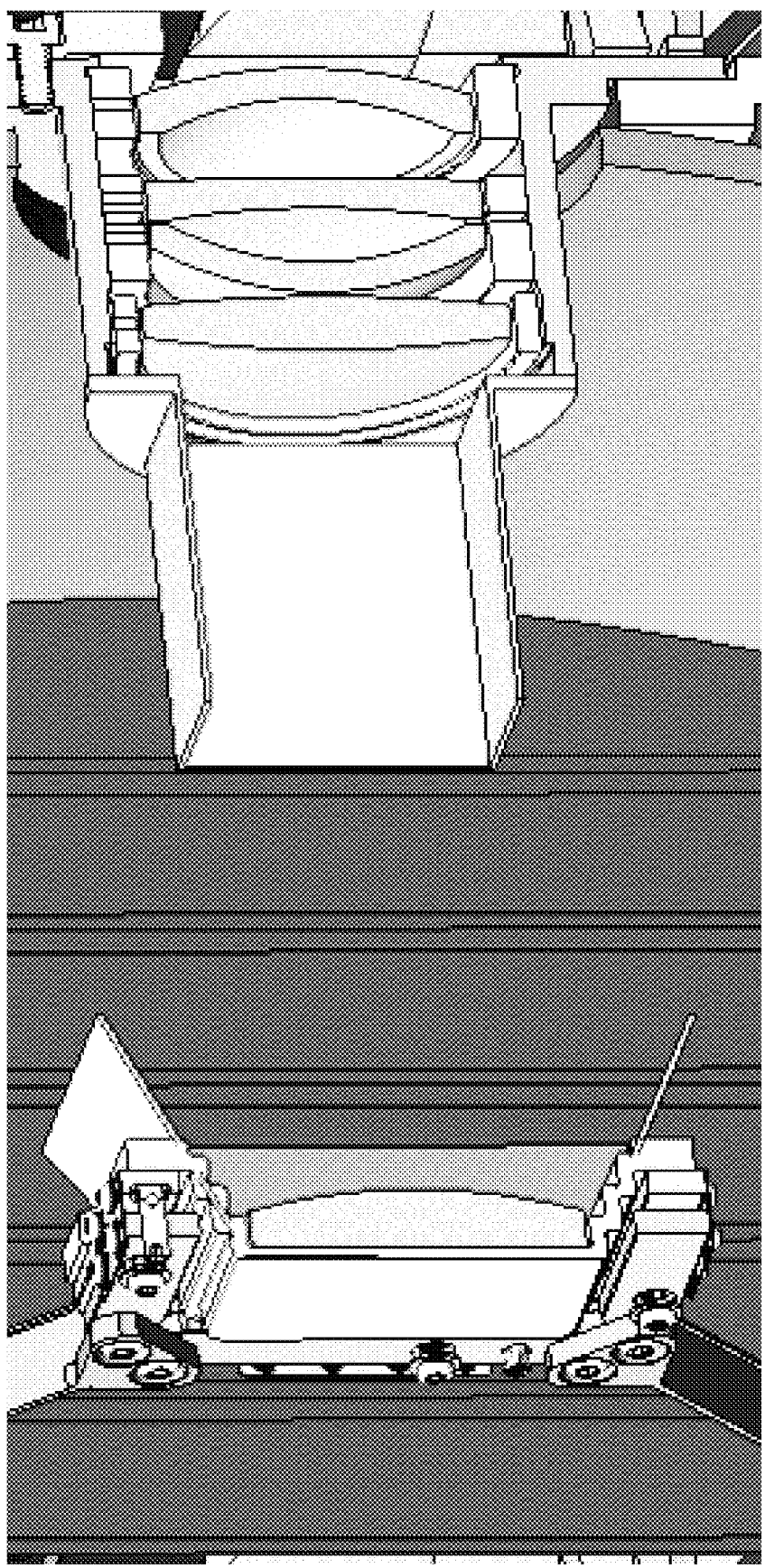
FIG. 11 is a cut-away view of a telescope section showing a square secondary mirror baffle and an optical barrel section.

FIG. 11 is a cut-away view of a telescope section showing a square secondary mirror baffle and an optical barrel section. This shows the relative positioning of a square secondary mirror baffle relative to square internal baffle.

FIG. 12 is a chart of spectral bands.

FIG. 13 illustrates examples of color filters used on pixel arrays.

Figure 14:
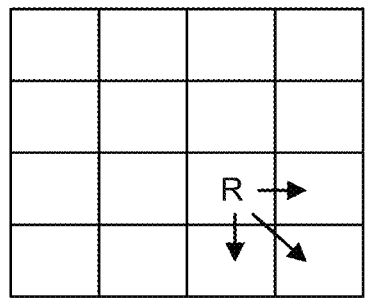
FIG. 14 illustrates an example of increased resolution from the use of subpixel shifting.
Figure 14:
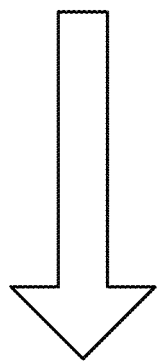
Figure 14:
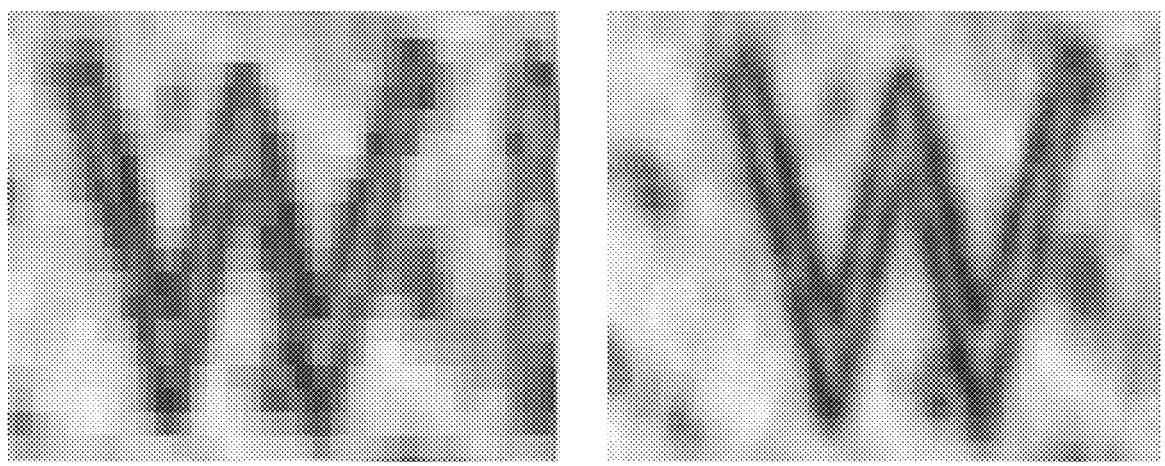

FIG. 14 illustrates an example of increased resolution (more accurately, increased discernible spatial content) from the use of subpixel shifting which reduces errors in the sampled image known as aliasing errors.

According to one embodiment, the techniques described herein are implemented by one or more generalized computing systems programmed to perform the techniques pursuant to program instructions in firmware, memory, other storage, or a combination. Although not shown, processing might be performed by a processor that accesses instructions in a program memory and controls communication and processing information. A processing system might include random access memory (RAM) or other dynamic storage device, or other intermediate information during execution of instructions to be executed by the processor. Such instructions, when stored in non-transitory storage media accessible to the processor, render the processing system into a special-purpose machine that is customized to perform the operations specified in the instructions. The processing system might also include a read only memory (ROM) or other static storage device for storing static information and instructions for the processor. The processing system may implement the techniques described herein using customized hard-wired logic, one or more ASICs or FPGAs, firmware and/or program logic which causes or programs the processing system to be a special-purpose machine. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Storage media is distinct from but may be used in conjunction with transmission media. Transmission media participates in transferring information between storage media. For example, transmission media includes coaxial cables, copper wire and fiber optics, including the wires that comprise a processor bus. Transmission media can also take the form of radio waves or light waves. Communication can be two-way data communication coupling to a ground station or another satellite.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A satellite imaging system, comprising:
   a telescope section comprising:
   a) a first reflector that is substantially square and sized to fit into a substantially square aperture of a satellite body, wherein a diagonal of the first reflector is greater than a dimension of the satellite body, and wherein the first reflector provides for a point spread function that is approximately square;
   b) a second reflector, positioned to reflect light reflected from the first reflector; and
   c) a lens set comprising one or more lenses positioned in an optical path of the telescope section, wherein the lens set further comprises a beam splitter and a plurality of prisms; and
   a sensor array positioned to receive light from the telescope section when light is received through the substantially square aperture, wherein the sensor array is substantially square.

2. The satellite imaging system of claim 1, wherein the second reflector is substantially square.

3. The satellite imaging system of claim 2, wherein the second reflector is oriented to align with an asymmetry of a point spread function of the substantially square aperture.

4. The satellite imaging system of claim 1, wherein the second reflector is substantially round.

5. The satellite imaging system of claim 1, wherein the lens set comprises lenses that are substantially square.

6. The satellite imaging system of claim 2, wherein the lens set is oriented to align with an asymmetry of a point spread function of the substantially square aperture.

7. The satellite imaging system of claim 1, wherein the lens set comprises lenses that are substantially round.

8. The satellite imaging system of claim 1, further comprising baffles.

9. The satellite imaging system of claim 8, wherein the baffles are substantially square.

10. The satellite imaging system of claim 8, wherein the baffles are substantially round.

11. The satellite imaging system of claim 1, wherein elements are substantially square when the elements have a form factor of a square adjusted for structural components needed to provide structural stability to the elements or other components of a satellite containing the satellite imaging system.

12. The satellite imaging system of claim 1, wherein the first reflector, the second reflector, and/or one or more lenses of the set of lenses comprises thermally matched materials in that the thermally matched materials to limit distortion of a final image over a predetermined set of operating conditions.

13. The satellite imaging system of claim 1, wherein the first reflector, the second reflector, and/or one or more lenses of the set of lenses are movable by motorized or deformable positioners to perform dynamic compensation of positional error and/or compensation for mechanical variations.

* * * * *